April 14, 1964 R. R. GRIFFEN 3,128,859
COMBINATION BRAKE AND ACCELERATOR CONTROL
Filed Dec. 13, 1960
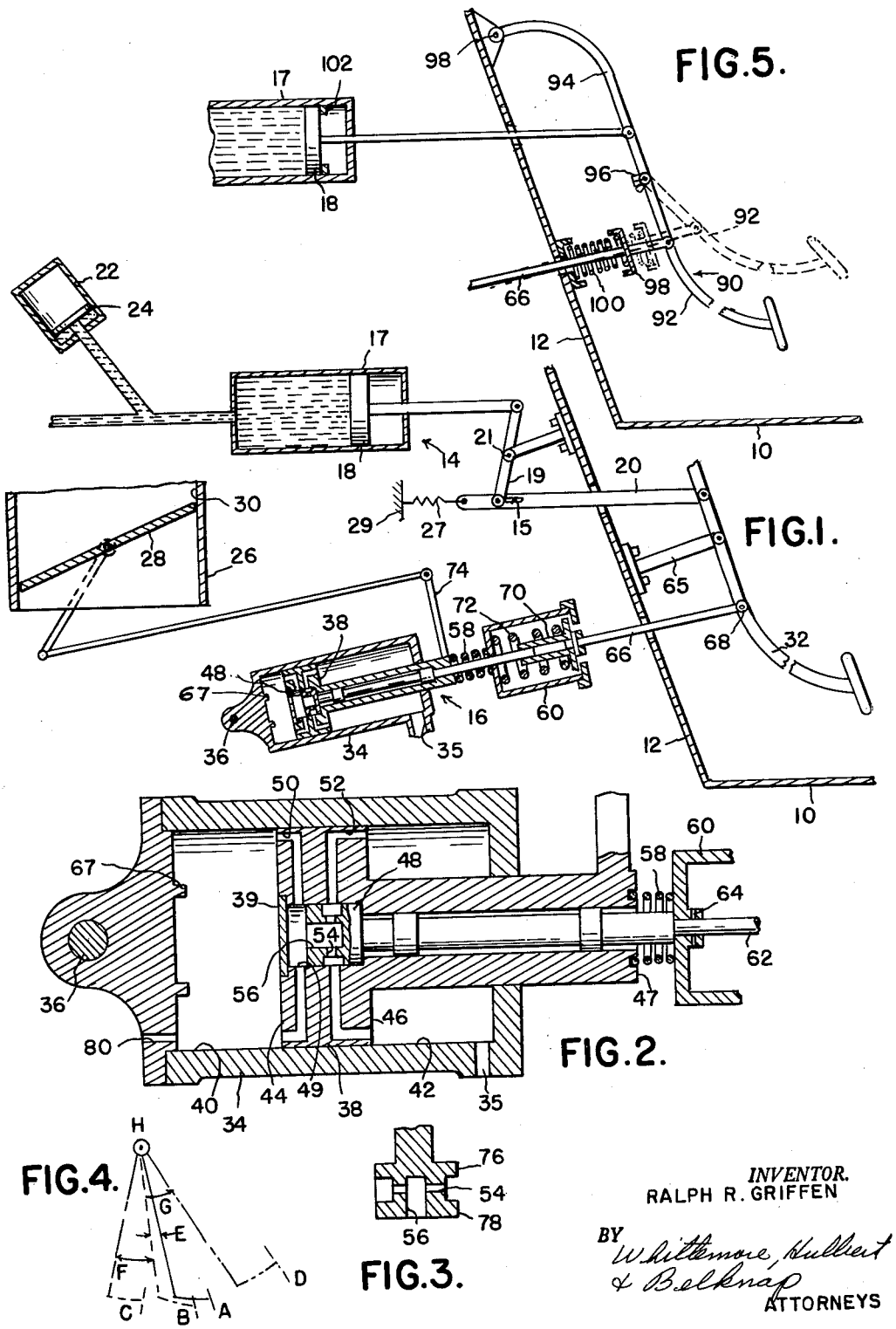
INVENTOR.
RALPH R. GRIFFEN
BY Whittemore, Hulbert
& Belknap
ATTORNEYS United States Patent Office 3,128,859
Patented Apr. 14, 1964

3,128,859
COMBINATION BRAKE AND ACCELERATOR
CONTROL
Ralph R. Griffen, Roseville, Mich., assignor to Holley Carburetor Company, Warren, Mich., a corporation of Michigan
Filed Dec. 13, 1960, Ser. No. 75,575
14 Claims. (Cl. 192—3)

This invention relates to a brake-accelerator system for a vehicle. More particularly, this invention relates to single actuated means for providing a dual function of controlling both the service brake and the accelerator system of an automotive vehicle.

The present application is a continuation-in-part of my copending application Serial No. 844,274, filed October 5, 1959.

The prior art discloses that one-pedal systems have been proposed before to control both the service brake and the accelerator. Such systems have required that the foot pedal or lever be depressed for acceleration and be released for braking. When the operator removed his foot from the pedal the vehicle would come to a stop. The stopping force and distance in such a system is a function of the distance the foot is raised from the pedal and the rapidity with which this operation is carried out. The proposed invention overcomes this dangerous characteristic of the prior systems in that removal of the operator's foot from the pedal will not cause a sudden stop of the vehicle but will permit the vehicle to simply drift towards an idling position.

The prior systems have also caused a considerable amount of confusion as to their operation which could result in accidents. If a vehicle operator was accustomed to the conventional method of applying the vehicle brakes and was called upon to overcome an emergency situation whereby it was necessary to quickly apply the brake, the natural tendency of any operator would be to depress the pedal in the conventional manner instead of releasing the pedal as required by the single pedal brake and accelerator control systems of the prior art. If the operator depressed the pedal instead of braking the vehicle he would find himself rapidly accelerating. This created a dangerous situation. The public therefore has not accepted the prior art systems.

The safety of passengers, pedestrians, and other vehicles depends upon the design and condition of brake equipment. Brakes must at all times and under varying conditions be capable of stopping the vehicle quickly to avoid collision or loss of control. The proposed invention has an advantage which lies in its reduction of stopping time and therefore stopping distance over the conventional two-pedal systems as presently employed.

The proposed invention operates in a reverse manner to the prior art systems. The operator is still required to depress the pedal in order to create the requisite force to apply the vehicle brakes. On the other hand, instead of depressing the pedal to actuate the accelerator mechanism, the foot pedal is controlled by raising the pedal, or in other words, releasing the force and permitting the pedal to rise.

If the operator for any reason should remove his foot from the pedal, a control cylinder responds accordingly and the pedal automatically returns to the normal idle carburetor position.

It is an object of this invention to provide a single pedal brake and accelerator control system.

Another object of this invention is to provide a single pedal service brake and accelerator system for an automotive vehicle.

A further object of the invention is to provide a combination brake and accelerator control system actuated by a single pedal wherein the stopping time and distance is reduced over one-pedal systems.

A still further object of this invention is to provide a single pedal brake and accelerator control which places emphasis on the safety requirements and factors involved in the operation of a vehicle.

Another object is to provide a dual brake and accelerator system which is improved, economical, reliable and flexible and which is adapted to be incorporated in present existing vehicles.

A further object is to provide an accelerator-brake control system wherein braking is provided by depressing the pedal and acceleration is controlled by permitting the pedal to raise from brake-off position, and in which the pedal returns to brake-off, throttle closed position whenever the operator's foot is removed from the pedal.

Still another object is to provide an improved accelerator control.

Other objects and features of the invention will become apparent as the description proceeds, especially when taken in conjunction with the accompanying drawing, illustrating a preferred embodiment of the invention, wherein:

FIGURE 1 is a schematic diagram showing a single pedal service brake-accelerator system.

FIGURE 2 is an enlarged view of the vacuum control cylinder and piston incorporated in the system.

FIGURE 3 is a partial sectional view of the shift piston shown in FIGURE 2.

FIGURE 4 is a diagrammatic view showing the various pedal positions and ranges.

FIGURE 5 is a fragmentary, schematic diagram of another embodiment of the present invention.

Referring to FIGURE 1, the conventional floor of an automobile represented by the numeral 10, has an upwardly extending fire wall 12 which separates the inside of the vehicle from the engine compartment. On the engine side of the wall 12 is employed a service braking system represented by numeral 14 and an accelerator control system represented by the numeral 16. Both of the systems are schematically represented in the drawing.

The braking mechanism 14 is the conventional type of service brake which is applied by pressure from the operator's foot. It is within the contemplation of this invention that the various methods of mechanical application of brakes may be used or that a hydraulic brake system may also be used, as is shown in FIGURE 1. Since the mechanical as well as the hydraulic braking systems have limitations as to sizes of cylinders, etc., the amount of braking force applicable is limited. These factors restrict the brake shoe to brake drum pressures obtainable. Therefore, a vehicle may incorporate power brakes to increase the braking force available. Such power brake systems may utilize air brakes which employ compressed air to actuate the braking mechanism; a vacuum system which utilizes the vacuum created in the intake manifold of the vehicle engine; or the electric brake which uses electrical energy stored in a battery.

The braking system 14 has a master cylinder 17 having a piston and rod 18 reciprocating in the master cylinder 17 under the control of the brake control rod or linkage 20. The linkage 20 includes a lost motion slot 15. A lever 19 pivoted at 21 connects the piston and rod 18 with the control rod 20. A wheel cylinder 22 having a piston 24 movable therein is conventionally represented to be of the type which is connected to the brake shoes (not shown). In this type of a system, the movement of the brake shoes against the drum is accomplished by movement of the piston 24 which is connected directly to the shoes. By varying the size of the cylinders 22 associated with each of the wheels in relation to the size of the master cylinder 17, it is possible to distribute the desired available pressure throughout the system. When force is applied to the brake control rod 20, the piston 18 moves in a direction to exert a pressure which is transmitted equally in all directions to the wheel cylinders 22.

A carburetor 26 is of the conventional type and is mounted normally on the engine of the vehicle. A throttle valve 28 is positioned in the mixing chamber 30 so as to regulate the amount of fuel flow from the carburetor 26 to the engine. FIGURE 1 shows the throttle valve in the normal idle position. The lost motion slot 15 in the control rod 20 permits closure of the throttle valve 28 before any braking force is applied. A spring 27 is connected on one end to the brake control rod or linkage 20 and on the other end to a fixed abutment 29. Spring 27 is a schematic representation of the return springs which exist in the conventional braking system.

The throttle valve 28 is controlled by the accelerator control mechanism 16 in response to the operator's control of the pedal 32 which is connected to both the brake mechanism 14 and to the accelerator mechanism 16. A vacuum control cylinder 34 is connected by a swivel pin 36 to the engine (not shown) or frame (not shown) of the vehicle. The cylinder 34 may be connected at 35 to any vacuum source, such as the intake manifold of the vehicle engine or to a fuel pump having a windshield booster pump. A piston 38 reciprocates within the cylinder 34 and divides the cylinder into a pair of pressure chambers 40 and 42. The first and largest area of the piston 38 which includes the welch plug 39 is represented by the numeral 44 and the second and intermediate area is represented by the numeral 46. The third area of piston 38 is represented by numeral 47. The size of the various piston areas may be selected and designed to obtain the proper forces necessary for operating the accelerator control mechanism 16. A servo piston or shift piston 48 is provided in the hollow portion 49 of the piston 38. After the shift piston 48 is inserted in the piston 38, the opening in the bottom of the piston 38 is closed by the welch plug 39. The shift piston 48 has a control rod 62. First passage means 50 and 52 are provided in the differential piston 38. Second passage means 54 and 56 are provided in the shift piston 48.

A very light spring 58 biases the shift piston 48 with reference to the differential piston 38 in a direction to connect the first and second passage means 50, 52, 54 and 56 to permit the vacuum to communicate between the chambers 40 and 42 when the carburetor is in an idle position as shown in FIGURE 1. The spring 58 abuts against the bottom of the spring housing 60. The spring housing 60 is secured to the shift piston rod 62 by a pin connection 64, as is illustrated in FIGURE 2, although it should be kept in mind that other means may be used for securing the housing 60 to the rod 62.

An accelerator control rod 66 is connected to the pedal 32 on one end thereof at 68 and is connected on the other end to the shift piston 48 by an overtravel arrangement which includes a sleeve 70 and an override spring 72 which are both located in the spring housing 60. The spring 72 is larger than the spring 58. The spring housing 60 prevents the force of spring 72 from affecting spring 58. A throttle linkage 74 connects the differential piston 38 to the throttle valve 28. A pair of small pins 67 is provided at the bottom of the cylinder 34 for preventing the piston 38 from bottoming in cylinder 34 and losing its working area which is subject to atmosphere or vacuum, as the case may be.

In FIGURE 1, the carburetor is in an idle position. The pedal 32 may be considered to be in a neutral position without any force applied to the pedal 32 by the vehicle operator. When depressing the pedal 32 so as to apply the brake mechanism 14, the control rod 20 is moved towards the operator. The linkage 19 pivots at 21 and forces the piston and rod 18 to the left, as viewed in FIGURE 1, into the cylinder 17 so as to displace fluid from the master cylinder 17 and apply pressure to the wheel cylinders 22. During this operation, the lever 32 which pivots on the support bracket 65 moves the accelerator control rod 66 inwardly, initially depressing the control spring 58 and in turn moving the shift piston 48 to a position to close the passages 52 and 50 with the piston lands 76 and 78 respectively. The override spring 72 is then depressed and permits the control rod 66 to move relative to the control piston 38 and the shift piston 48.

The operation of the entire system will be discussed from the following positions: (1) Brake off—engine off; (2) brake off—engine idle; (3) brake off—throttle slightly open; (4) brake off—throttle wide open; (5) brake on—engine idle; and (6) brake on—engine off.

In referring to FIGURE 4, it suffices to say at this time that the solid line lever or pedal is shown in a position identified by the letter "A" to represent the brake off and the engine at an idle position. Spring 27 could be made to exert sufficient force to position pedal 32 at position "D" in FIGURE 4 when the engine is off so as to fully open throttle 28 and allow starting under flooded conditions.

The shift piston 48, as shown in FIGURES 1 and 2 connects the passages in the main control pistion 38 with chambers 42 and 40 so as to permit vacuum from chamber 42 to also act in chamber 40. As a result thereof, the atmosphere acting on area 47 creates a force to move the throttle valve 28 to an idle position. The angle subtended by the pedal when in the idle position "A" and moving to position "B" is represented by the letter "E." This is the initial travel which takes place when a slight force is applied to the pedal 32 so as to move the pedal in a downward direction away from the operator to compress the control spring 58.

When the spring 58 is compressed, the shift piston or servo valve 48 moves to a lower position to prevent fluid communication between chambers 40 and 42. Since the vacuum is no longer connected to chamber 40, atmospheric pressure is exposed to the chamber 40 through restricted vent means 80 so as to act on the piston area 44 and tend to move piston 38 in an upward direction. As long as control spring 58 is compressed, this condition will exist so that there is a force applied to the piston 38 which tends to "push up" on the operator's foot.

As the pedal is moved from position "B" to the full braking position represented by position "C," an angle "F" is subtended. This angle represents the maximum angle which must be subtended in order to fully apply the brake mechanism. The greater the force applied to the master cylinder 17, the greater is the force transmitted by the cylinder 17 equally in all directions to the wheel cylinders 22.

In order to permit the brake control rod 20 to move so as to apply the brake mechanism 14, it is necessary to provide an overtravel arrangement which permits the acceleration control rod 66 to move when the braking mechanism 14 is being applied. This movement of the acceleration control rod 66 will not disturb the throttle valve 28 since the throttle valve 28 is already closed. The overtravel means consist of the sleeve 70 and the override spring 72 which is larger than the control spring 58. After the control spring 58 has been depressed until passages 50 and 52 are closed by piston 48, a continued downward force in the braking direction will compress the override spring 72 and permit the accelerator control rod 66 to move without disturbing the acceleration control cylinder 34. When the brakes have been applied, the engine may be in an off or in an idle position.

When the operator releases the brake mechanism and starts to accelerate, he decreases the foot pressure required for braking so as to permit the lever in braking position "C" to move toward him and toward position "B." This is due to the atmospheric pressure acting on area 44 and tending to move the piston 38 in a direction to open the throttle valve 28. During this interval, the energy stored in spring 72 is released and returns the spring 72 to its normal position. The control spring 58 remains in a compressed position due to the slight force applied to the lever by the operator such that the force on the main control piston 38 is constantly exerting an upward force on the foot of the operator. As long as the spring 58 remains compressed, the lever 32, when having attained position "B," will move towards a position "D" which would represent the throttle 28 in a wide open position as controlled by the operator. When the lever 32 has moved towards the operator, the spring 58 remaining compressed, the throttle starts to open. It will be observed that this function takes place only after the brakes have been released and the control spring 72 has returned to its normal position. When the lever 32 moves in an upward direction from position "B" to position "D," the piston 38 moves the throttle from a slightly open position to a wide open position. The amount the throttle is opened depends upon the operator's control of the pedal, so long as the compression spring 58 remains in a compressed position. This operation describes the situation where the brake is off and the throttle is moving from a closed to a wide open position.

Once the operator has removed the force from the lever 32 necessary to compress the spring 58, the spring 58 will return the secondary piston 48 to a position as shown in FIGURES 1 and 2 to permit vacuum to travel to both sides of the piston 46. The atmosphere acting on the outer area 47 of piston 38 is sufficient to move the piston 38 in a leftward direction as viewed in FIGURE 1 to close the throttle valve 28. This operation returns the carburetor to an idle position which is represented in FIGURE 4 as position "A."

Another embodiment of the present invention is shown in FIGURE 5. Where applicable, the same numerical designations will be utilized. The floor 10 has an upwardly extending fire wall 12 which separates the inside of the vehicle from the engine compartment. The accelerator control mechanism 16 utilized in FIGURE 1 also forms part of the embodiment in FIGURE 5. The control rod 66 extends through an opening in the fire wall 12 and is connected to the single pedal 90. The pedal 90 is made in two parts 92 and 94 which are connected together at a pivot or swivel connection 96. The pedal 90 is hingedly mounted on the fire wall as represented by the numeral 98.

The pedal 90 shown in solid lines represents the position of the pedal when the carburetor is in an idle position and the brake mechanism is not applied. This position corresponds to position "A" of FIGURE 4. The pedal part 92 shown in dotted lines represents the position of part 92 when the throttle 28 is in an open position.

The control rod 66 has an abutment 98 thereon on the inside of the vehicle. A spring 100 is interposed around the control rod 66 in between the abutment 98 and the fire wall 12 for controlling the throttle opening position with the engine off. It should be understood that the use of the spring 100 is optional and that it may be utilized in either embodiment. Cylinders 17 and 34 are pivotally mounted (not shown) so as to permit their piston and rod assemblies to freely move with reference to the cylinders according to the position of the pedal 90.

The operation of the device shown in FIGURE 5 is similar to the operation of the device shown in FIGURE 1, the essential or primary difference being in the swiveling of part 92 with respect to part 94 of the pedal 90 during the movement of the pedal 90 from position "A" toward position "D" as explained in FIGURE 4. When the pedal 90 moves from position "A" to position "C" in the braking direction, the parts 92 and 94 of pedal 90 move together as if the pedal 90 was constructed as a solid lever. When the pedal 90 moves from position "A" toward position "D" in the accelerating direction, the part 94 is prevented from moving, since the piston 18 is in contact with an abutment 102 provided in the cylinder 17.

The force exerted through the control rod 66 swivels part 92 about pivot 96 with respect to part 94.

I have disclosed an acceleration-brake system which provides adequate "feel" for acceleration and for braking purposes. By selectively choosing different spring rates, various design features may be met so as to provide a system which will meet safety codes. This system is not only safer than the prior art systems, but is also economical, reliable, and flexible so as to be incorporated in new or used vehicles.

The drawing and the foregoing specification constitute a description of the improved combination brake and accelerator control in such full, clear, concise and exact terms as to enable any person skilled in the art to practice the invention, the scope of which is indicated by the appended claims.

What I claim as my invention is:

1. A brake-throttle control system comprising a brake actuating element for moving the brake between applied and released positions, a throttle actuating device for moving the throttle between closed and opened positions comprising a movable actuating member which is connected to the throttle, power means for moving said actuating member, a movable control member for said power means interconnected to said actuating member for movement therewith and limited movement relative thereto, and biasing means having a predetermined relatively small effectiveness interconnecting said control member and said actuating member, an operating member for said brake actuating element and said throttle actuating device, said operating member being movable in a predetermined path from an intermediate neutral position in which the throttle is closed and the brake is released through a brake actuating range at one side of said neutral position and through a throttle actuating range at the other side of said neutral position, first means providing for relative motion between said operating member and said control member of the throttle actuating device when said operating member is moved through the aforesaid brake actuating range, second means providing for relative motion between said operating member and said brake actuating element when said operating member is moved through the aforesaid throttle actuating range, said operating member being moved by a force applied thereto which is effective to move said control member with respect to said actuating member and overcome said biasing means so as to energize said power means, said power means being capable of applying a force to said actuating member which exceeds the force applied to said operating member required to overcome said biasing means and which tends to move said actuating member in a direction opposite to the movement of said control member to move the throttle to an open position whereby the application and maintenance of a force on said operating member which exceeds the force of said power means causes said operating member to move in the brake actuating range to move the brake to an applied position through said brake actuating element and whereby the application and maintenance of a force on said operating member which has a magnitude greater than the force required to overcome said biasing means but less than sufficient to overcome the force of said power means causes the actuating member to be moved by said power means to move the throttle to an open position.

2. A brake-throttle control system defined in claim 1 wherein said biasing means is in the form of resilient means.

3. A brake-throttle control system defined in claim 2 wherein said resilient means is a spring.

4. A brake-throttle control system defined in claim 1 wherein said operating member is a pivotally mounted foot operated pedal.

5. A brake-throttle control system defined in claim 4 wherein said pedal is made in two parts which are pivotally connected for movement together as a unit when the pedal is moved in the brake actuating range and for pivotal movement of one part with respect to the other part when said pedal is moved through the throttle actuating range.

6. A brake-throttle control system defined in claim 1 wherein said second means includes a mechanical lost motion connection between said operating member and said brake actuating element.

7. A brake-throttle control system defined in claim 1 wherein said first means includes resilient means which has an effectiveness greater than said biasing means interposed between said operating member and said control member, said resilient means being effective to transmit the force applied to said operating member to said control member when said operating member is moved through the aforesaid brake actuating range due to a force applied threto which is greater than the force of said power means and which is effective to transmit the force of said power means to said operating member when said operating member is moved through the aforesaid throttle actuating range.

8. A brake-throttle control system defined in claim 7 wherein said resilient means is a spring.

9. A brake-throttle system for an internal combustion engine having a source of vacuum comprising a brake actuating element for moving the brake between applied and released positions, a throttle actuating device for moving the throttle between closed and opened positions comprising a cylinder closed on both ends, a hollow piston in said cylinder, a tubular stem connected at one end to one side of said piston and projecting through an end wall of said cylinder to expose the other end thereof to the atmosphere, said stem being spaced from the side walls of said cylinder to define a first chamber in said cylinder at one end thereof, a second chamber in said cylinder at the other end thereof opposite the other side of said piston, passages in said piston between said chambers and the interior of said piston, passage means connecting said first chamber to the source of vacuum, restricted passage means connecting said second chamber to the atmosphere, a valve movably received in the interior of said piston and controlling communication between said chambers, a rod movable longitudinally in said stem and connected at one end to said valve, an abutment on said rod, linkage means connecting said stem to the throttle to control the position thereof, resilient means provided between said abutment and said other end of said stem for biasing said rod in one direction away from the other end of the cylinder to provide communication between said chambers, whereby the atmospheric pressure acting on said other end of the stem is effective to move said stem towards said other end of the cylinder to urge said throttle in a closing direction through said linkage means, an operating member for said brake actuating element and said throttle actuating device, said operating member being movable in a predetermined path from an intermediate neutral position in which the throttle is closed and the brake is released through a brake actuating range at one side of said neutral position and through a throttle actuating range at the other side of said neutral position, means providing for relative motion between said operating member and said rod of the throttle actuating device when said operating member is moved through the aforesaid brake actuating range, means providing for relative motion between said operating member and said brake actuating element when said operating member is moved through the aforesaid throttle actuating range, said operating member being moved by a force applied thereto which is effective to move said rod towards said other end of the cylinder and thereby compress said resilient means and move said valve to a position to block communication between said chambers through said passages, whereby the atmospheric pressure acting in said second chamber is effective, while said resilient means remains compressed due to the force on said operating member, to tend to move said piston and said stem in said one direction to move said throttle to an open position, said system being constructed and arranged so that the application and maintenance of a force on said operating member which exceeds the force on said piston due to the atmospheric pressure in said second chamber causes said operating member to move in the brake actuating range to move the brake to an applied position through said brake actuating element and whereby the application and maintenance of a force on said operating member which has a magnitude greater than the force required to overcome said resilient means but less than sufficient to overcome the force on said piston due to the atmospheric pressure in said second chamber causes said piston and said stem to be moved in said one direction to move the throttle to an open position through said linkage means.

10. A brake-throttle control system defined in claim 9 wherein said resilient means is a spring.

11. A brake-throttle control system defined in claim 9 wherein said operating member is a pivotally mounted foot operated pedal.

12. A brake-throttle control system defined in claim 9 wherein said first means includes resilient means which has an effectiveness greater than said biasing means interposed between said operating member and said control member, said resilient means being effective to transmit the force applied to said operating member to said control member when said operating member is moved through the aforesaid brake actuating range due to a force applied thereto which is greater than the force of said power means and which is effective to transmit the force of said power means to said operating member when said operating member is moved through the aforesaid throttle actuating range.

13. A brake-throttle control system defined in claim 12 wherein said resilient means is a spring.

14. A brake-throttle system defined in claim 9 wherein a passage is provided in said valve which is connected to the passages in said piston to provide communication between said chambers when said resilient means biases said rod in said one direction.

References Cited in the file of this patent

UNITED STATES PATENTS

| | | |
|---|---|---|
| 2,164,921 | Hoff | July 4, 1939 |
| 2,362,723 | Sanford | Nov. 14, 1944 |
| 2,516,824 | Gossweiler | July 25, 1950 |
| 2,596,998 | Van Hilson | May 20, 1952 |
| 2,610,716 | Adams et al. | Sept. 16, 1952 |
| 2,758,684 | Stickel | Aug. 14, 1956 |
| 2,764,134 | Crimi | Sept. 25, 1956 |
| 2,845,815 | Koehler et al. | Aug. 5, 1958 |
| 2,868,035 | Mudon | Jan. 13, 1959 |
| 2,951,567 | Panhard | Sept. 6, 1960 |